(12) United States Patent
Gwidt et al.

(10) Patent No.: US 9,057,339 B2
(45) Date of Patent: Jun. 16, 2015

(54) STOCHASTIC PRE-IGNITION MITIGATION SYSTEM

(75) Inventors: J. Michael Gwidt, Brighton, MI (US); Karen Margaret-Bell Gwidt, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 13/553,294

(22) Filed: Jul. 19, 2012

(65) Prior Publication Data

US 2014/0025278 A1   Jan. 23, 2014

(51) Int. Cl.
*G06F 19/00* (2011.01)
*F02D 41/40* (2006.01)
*F02D 41/14* (2006.01)
*F02D 41/22* (2006.01)
*F02D 35/02* (2006.01)

(52) U.S. Cl.
CPC .......... *F02D 41/402* (2013.01); *F02D 41/1497* (2013.01); *F02D 41/22* (2013.01); *F02D 41/401* (2013.01); *F02D 35/027* (2013.01); *F02D 35/028* (2013.01); *F02D 2200/1004* (2013.01); *F02D 2200/101* (2013.01); *F02D 2200/1012* (2013.01); *Y02T 10/44* (2013.01)

(58) Field of Classification Search
CPC ...... F02D 35/027; F02D 41/402; F02P 5/152; F02P 2017/128
USPC .................. 123/299, 406.21, 406.29, 406.37, 123/406.45, 406.47, 436; 73/35.07, 114.02, 73/114.08, 114.62; 701/105–105, 110–11
See application file for complete search history.

(56) References Cited

U.S. PATENT DOCUMENTS

| 6,814,048 | B2* | 11/2004 | Sauler et al. .................. 123/299 |
| 7,302,932 | B2* | 12/2007 | Shelby et al. ............ 123/406.26 |
| 7,854,218 | B2* | 12/2010 | Kapus et al. .................. 123/435 |
| 8,073,613 | B2* | 12/2011 | Rollinger et al. ............. 701/111 |
| 8,347,852 | B2* | 1/2013 | Glugla et al. ................. 123/305 |
| 8,666,637 | B2* | 3/2014 | Glugla et al. ................. 701/104 |
| 8,677,975 | B2* | 3/2014 | Auclair et al. ................ 123/435 |
| 2012/0245827 | A1* | 9/2012 | Glugla et al. ................. 701/105 |

* cited by examiner

*Primary Examiner* — Stephen K Cronin
*Assistant Examiner* — Robert Werner

(57) ABSTRACT

A stochastic pre-ignition (SPI) mitigation system includes a detection module, an engine load module, and an evaluation module. The detection module generates a pre-ignition determination signal indicating detection of a SPI event in a cylinder of an engine. The engine load module determines load on the engine and generates an engine load signal based on the load. The evaluation module determines whether to operate in a single-pulse mode or a multi-pulse mode and generating a mode signal to operate in a selected one of the single-pulse mode and the multi-pulse mode based on the pre-ignition determination signal and the engine load signal. The single pulse mode includes injecting a single pulse of fuel into the cylinder during a first per combustion cycle of the cylinder. The multi-pulse mode includes injecting multiple pulses of fuel into the cylinder during a second combustion cycle of the cylinder.

18 Claims, 3 Drawing Sheets

STOCHASTIC PRE-IGNITION MITIGATION SYSTEM

FIELD

The present invention relates to engine control systems and more particularly to ignition control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) combusts an air/fuel mixture within cylinders to drive pistons, which produces drive torque. Air flow into an ICE engine may be regulated via a throttle and adjustment in throttle area. Adjustment in throttle area alters air flow into the ICE. As the throttle area increases, the air flow into the engine increases. Fuel injection rate is adjusted in addition to adjustment in air flow to provide the air/fuel mixture. Increasing the amount of air and fuel provided to cylinders of the ICE increases torque output of the ICE. Engine control systems have been developed to control engine torque output.

Spark ignition direct injection (SIDI) refers to direct injection of fuel into cylinders of a spark ignited gasoline engine. SIDI allows for improved control of fuel injection timing. In a SIDI engine, fuel may be injected at various times during a combustion cycle. This is unlike port fuel injected engines where fuel is injected, for example, into a port and/or intake manifold of an engine and before an intake stroke of a corresponding combustion cycle. The increased control that may be associated with an SIDI engine provides increased horsepower, reduced emissions and knock suppression.

Turbo-charged SIDI engines can experience stochastic pre-ignition (SPI) events. SPI events are more likely to occur in turbo-charged engines than non-turbo-charged (or normally aspirated) engines due to the increased pressures, power and torque levels in turbo-charged engines. An SPI event is not controlled by a spark from spark plug at a predetermined engine position (e.g., angular position of a crankshaft of the engine 102). A SPI event may occur due to, for example, a highly pressured air/fuel mixture coming in contact with a highly heated component (e.g., a valve or spark plug) within an engine cylinder. This can occur during high-engine loading (engine loading greater than a predetermined engine load) and at low-engine speeds (engine speeds less than a predetermined engine speed). An SPI event progressively degenerates due to the early ignition associated with the SPI event and since components within an engine cylinder tend to increase in temperature with each engine cycle during the SPI event. For this reason, a SPI event may be referred to as a run-away pre-ignition event.

SPI events tend to occur randomly and sporadically and can thus be unpredictable. SPI events can negatively affect fuel economy and/or control of torque output of an engine. If not minimized and/or prevented, SPI events can cause damage to engine components over time.

SUMMARY

A stochastic pre-ignition (SPI) mitigation system is provided and includes a detection module, an engine load module, and an evaluation module. The detection module generates a pre-ignition determination signal indicating detection of a SPI event in a cylinder of an engine. The engine load module determines load on the engine and generates an engine load signal based on the load. The evaluation module determines whether to operate in a single-pulse mode or a multi-pulse mode and generating a mode signal to operate in a selected one of the single-pulse mode and the multi-pulse mode based on the pre-ignition determination signal and the engine load signal. The single pulse mode includes injecting a single pulse of fuel into the cylinder during a first combustion cycle of the cylinder. The multi-pulse mode includes injecting multiple pulses of fuel into the cylinder during a second combustion cycle of the cylinder.

In other features, a stochastic pre-ignition (SPI) mitigation method is provided and includes generating a pre-ignition determination signal indicating detection of a SPI event in a cylinder of an engine. Load on the engine is determined and an engine load signal is generated based on the load. The method further includes determining whether to operate in a single-pulse mode or a multi-pulse mode and generating a mode signal to operate in a selected one of the single-pulse mode and the multi-pulse mode based on the pre-ignition determination signal and the engine load signal. The single pulse mode includes injecting a single pulse of fuel into the cylinder during a first combustion cycle of the cylinder. The multi-pulse mode includes injecting multiple pulses of fuel into the cylinder during a second combustion cycle of the cylinder.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
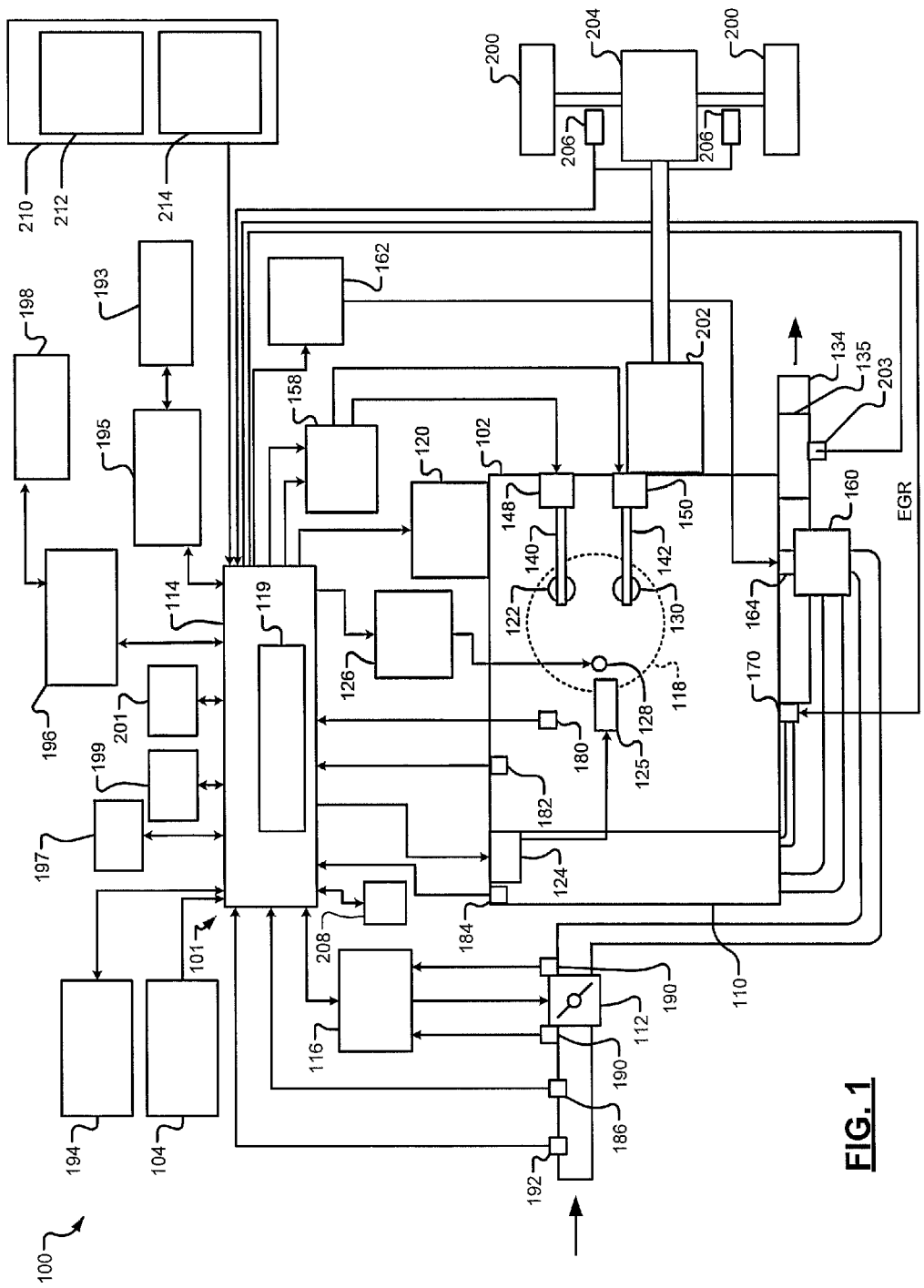
FIG. 1 is a functional block diagram of a powertrain system incorporating a stochastic pre-ignition mitigation system in accordance with the present disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke. The four-strokes are repeated during operation of the engine.

In FIG. 1, a powertrain system 100 incorporating a stochastic pre-ignition (SPI) mitigation system 101 is shown. The SPI mitigation system 101 detects SPI events, extinguishes the SPI events and minimizes and/or prevents subsequent SPI events.

Although the powertrain system 100 is shown as a hybrid powertrain system, the implementations disclosed herein may be applied to a non-hybrid powertrain system. The powertrain system 100 may be configured for a hybrid electric vehicle, a non-hybrid vehicle and/or for a SIDI engine. The powertrain system 100 includes an engine 102 that combusts an air/fuel mixture to produce drive torque for a vehicle based on a driver input module 104. Although the engine 102 is shown as a SIDI engine, the engine 102 may be a spark ignition, homogenous spark ignition, stratified spark ignition, and/or spark assisted compression ignition engine. Air is drawn into an intake manifold 110 through a throttle valve 112. An engine control module (ECM) 114 commands a throttle actuator module 116 to regulate opening of the throttle valve 112 to control the amount of air drawn into the intake manifold 110. Air from the intake manifold 110 is drawn into cylinder(s) of the engine 102. The engine 102 may include any number of cylinders (a single cylinder 118 is shown).

The ECM 114 includes a fuel control module 119, which controls the amount of fuel injected by a fuel injection system 124 into the cylinder 118. The fuel injection system 124 includes one or more fuel injectors 125. The fuel injection system 124 may inject fuel directly into the cylinder 118, as shown.

The SPI mitigation system 101 includes the fuel control module 119, the fuel injection system 124, and other modules and devices described below. The SPI mitigation system 101 operates in different fuel injection pulse modes. A first fuel injection pulse mode, referred to as a single pulse mode (SPM), includes the injecting of a single pulse of fuel into a combustion chamber (i.e. the cylinder 118) during a combustion cycle. A combustion cycle may, for example, in a 4-stroke engine, refer to a single sequencing through the 4 strokes (intake, compression, ignition, and exhaust). The SPM includes a single fuel injection pulse per combustion cycle. The single fuel injection pulse may be provided prior to (i.e. during an exhaust stroke) or during an intake stroke. For example, the single fuel injection pulse may be provided within a start-of-injection (SOI) at 250°-380° before a piston is at a top most position or top dead center (TDC). SOI refers to when a fuel injection pulse begins. The timing of the single fuel injection pulse may be referred to as "normal" timing and may be performed at a first predetermined angular position of the crankshaft.

A second fuel injection pulse mode and a third fuel injection pulse mode, referred to as multi-pulse modes (MPMs), include injecting two or more pulses of fuel into the cylinder 118 during a combustion cycle. During a MPM, a first pulse of fuel may be injected into a cylinder during a combustion cycle followed by injection of one or more other pulses of fuel in the same combustion cycle. During the second fuel injection pulse (or dual-pulse) mode, in addition to the first injection, a second injection may be provided early in a compression stroke. As an example, the second fuel injection pulse may be provided with an end-of-injection (EOI) at 140°-220° before TDC. EOI refers to when a fuel injection pulse ends. During the third fuel injection pulse (or triple-pulse) mode, in addition to the first injection and the second injection, a third injection may be provided late in the compression stroke. For example, the third injection pulse may be provided with an EOI at 0°-140° before TDC.

During the MPMs, the first fuel injection pulse of fuel into the cylinder 118 may provide 20-90% of a total fuel charge for a single combustion (or engine) cycle. The second pulse or the second and third pulses of fuel may each provide 10-80% of the total fuel charge for a single combustion cycle. As an example, during the dual-pulse mode, a first pulse of fuel may provide 60% of a total fuel charge for a combustion cycle and be generated prior to or during an intake stroke. The second pulse of fuel may provide 40% of the total fuel charge and may be injected during the compression stroke.

As another example, during the triple-pulse mode, the first pulse of fuel may provide 60% of a total fuel charge for a combustion cycle and be generated prior to or during an intake stroke. The second pulse of fuel and the third pulse of fuel may each provide 20% of a total fuel charge. The same overall amount of fuel provided to the cylinder and/or the same overall air/fuel ratio within the cylinder may be provided during one or more combustion cycle(s) regardless of whether the powertrain system 100 is operating in the SPM or one of the MPMs.

Although the SPM and the MPMs may each provide lean, stoichiometric and/or rich overall air/fuel ratios in each of the cylinder(s) 118, during the MPMs the second and third fuel injection pulses provide a rich and/or richer air/fuel ratio (less than 14.7:1 air/fuel ratio) near the spark plug(s) 128 in the cylinder(s) 118. The second and third fuel injection pulses of fuel increase in-cylinder motion of air/fuel particles in the cylinder(s) 118 and provide a small rich cloud(s) around the spark plug(s) 128, which increases combustion stability. This rich air/fuel mixture near the spark plug(s) 128 may provide strong ignitions resulting in a more complete combustion. The MPMs reduce likelihood of stochastic pre-ignition, which increases the life of engine components.

The powertrain system 100 and the SPI mitigation system 101 and corresponding modules may operate in one or more of the described modes. For example, the fuel control module 119 may operate in the SPM or in the MPMs when SPI events are detected. Operating in the MPMs extinguishes the SPI events and prevents other SPI events from occurring for extended period of times. Transitioning in and out of the SPM and the MPMs is further described with respect to FIGS. 2 and 3 below.

In operation, air from the intake manifold 110 is drawn into the cylinder 118 through an intake valve 122. The fuel injected by the fuel injection system 124 mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. Ignition timing may be referred to as spark timing herein. Fuel injection and spark timing may be specified relative to an angular position of the crankshaft of the engine 102 and relative to when the piston is at TDC. At TDC the air/fuel mixture is in a most compressed state.

The combustion of the air/fuel mixture drives the piston down, thereby rotating the crankshaft. The piston then begins moving up again and expels the byproducts of combustion through an exhaust valve 130. The byproducts of combustion are exhausted from the vehicle via an exhaust system 134. Exhaust passes through a catalyst 135.

The intake valve 122 may be controlled by an intake camshaft 140, while the exhaust valve 130 may be controlled by an exhaust camshaft 142. An ECM 114 may regulate the position of the intake valve 122 and/or the exhaust valve 130 to regulate the quantity of air ingested and inert residual gases retained in the cylinder 118. The ECM 114 may also adjust operation of the fuel injector(s) 125, such as ON time and/or size of injector openings, to increase the amount of fuel injected into the cylinder 118. The ECM 114 may also adjust the timing of the exhaust camshaft(s) corresponding to the change in the air/fuel mixture.

The crankshaft angle at which the intake valve 122 is opened may be varied with respect to piston TDC by an intake cam phaser 148. The crankshaft angle at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The powertrain system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. As an alternative and/or in addition to incorporating the turbocharger 160 in the powertrain system 100, the powertrain system 100 may include a supercharger (not shown). The supercharger may provide compressed air to the intake manifold 110 and may be driven by the crankshaft.

The powertrain system 100 may include an exhaust gas recirculation (EGR) valve 170, which selectively redirects exhaust gas back to the intake manifold 110. In various implementations, the EGR valve 170 may be located after the turbocharger 160. The powertrain system 100 may measure the speed of the crankshaft in revolutions per minute (RPM) using an engine speed sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. The MAF sensor 186 may be located in a housing that includes the throttle valve 112.

The throttle actuator module 116 may monitor the position of the throttle valve 112 using one or more throttle position sensors (TPS) 190. The ambient temperature of air being drawn into the powertrain system 100 may be measured using an intake air temperature (IAT) sensor 192. The ECM 114 may use signals from the sensors 180, 182, 186, 190, 192 and from other sensors disclosed herein to make control decisions for the powertrain system 100. The fuel control module 119 may use signals from the sensors 180, 182, 186, 190, 192 and from other sensors disclosed herein to make decisions for the SPI mitigation system 101. This may include transitioning in and out of the SPM and the MPMs.

The ECM 114 may communicate with a transmission control module 194 to coordinate shifting gears in a transmission (not shown). For example, the ECM 114 may reduce torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is an amount of spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phase angles, air/fuel ratio, and number of cylinders activated, respectively.

While electric motor 198 may provide torque in series and/or in parallel with the torque output of engine 102, it should be appreciated that other configurations are also contemplated to be within the scope of this description. For example, electric motor 198 may be implemented as one or more electric motors that provide torque directly to wheels 200 instead of passing through a transmission 202.

The combined torque of engine 102 and electric motor 198 is applied to an input of transmission 202. Transmission 202 may be an automatic transmission that switches gears in accordance with a gear change command from the ECM 114.

An output shaft of transmission 202 is coupled to an input of a differential gear 204. Differential gear 204 drives axles and wheels 200. Wheel speed sensors 206 generate signals that indicate a rotation speed of their respective wheels 200.

The ECM 114 estimates an engine output torque to provide based on received sensor signals and other parameters described herein. The ECM 114 may adjust position of the throttle, air-fuel ratio, valve timing, fuel injection, etc. to provide the estimated engine output torque. Based on a desired engine output torque, the ECM 114 controls engine devices such that a desired air flow, a desired fuel injection, and/or a desired spark timing is achieved. The desired engine output torque may be based on a vehicle operator (driver) request and/or may be controller based, such as a torque output request from a cruise control system.

The sensor signals that are received by the ECM 114 may include sensor signals from: the MAP sensor 184, the MAF sensor 186, the throttle position sensor 190, the IAT sensor 192, an accelerator pedal position sensor 195, or other sensors, such as the engine coolant temperature sensor 182, the engine speed sensor 180, an ambient temperature sensor 197, an oil temperature sensor 198, a vehicle speed sensor 201, and an exhaust or catalyst temperature sensor 203.

The ECM 114 communicates with the throttle actuator module 116. The ECM 114 receives a throttle position signal from the throttle position sensor 190 and adjusts throttle position based on the throttle position signal. The ECM 114 may control the throttle 112 using a throttle actuator based on a position of an accelerator pedal 193. The throttle actuator module 116 may include a motor or a stepper motor, which provides limited and/or coarse control of the throttle position.

Air mass, volume, and pressure per cylinder may be determined and/or estimated based on signals from the sensors 184, 186. The ECM 114 may determine a throttle area based on a desired MAP and a desired MAF, and may generate a control signal to control the throttle based on the throttle area. The desired MAP and MAF may be determined based on engine speed and torque request signals.

The powertrain system 100 may further include a barometric pressure sensor 208. The barometric pressure sensor 208 may be used to determine environmental conditions, which may be further used to determine a desired throttle area. The desired throttle area may correspond to a specific throttle position.

The powertrain system 100 and/or SPI mitigation system 101 may also include various tables 210, which may be used by the fuel control module when performing in the SPM and the MPMs. The tables 210 may include SPM tables 212 and MPM tables 214. The tables 210 may each be associated with one or more of the tasks described with respect to the method of FIG. 3. Example modules of the fuel control module 119 are shown and described with respect to FIGS. 2 and 3.

Figure 2:
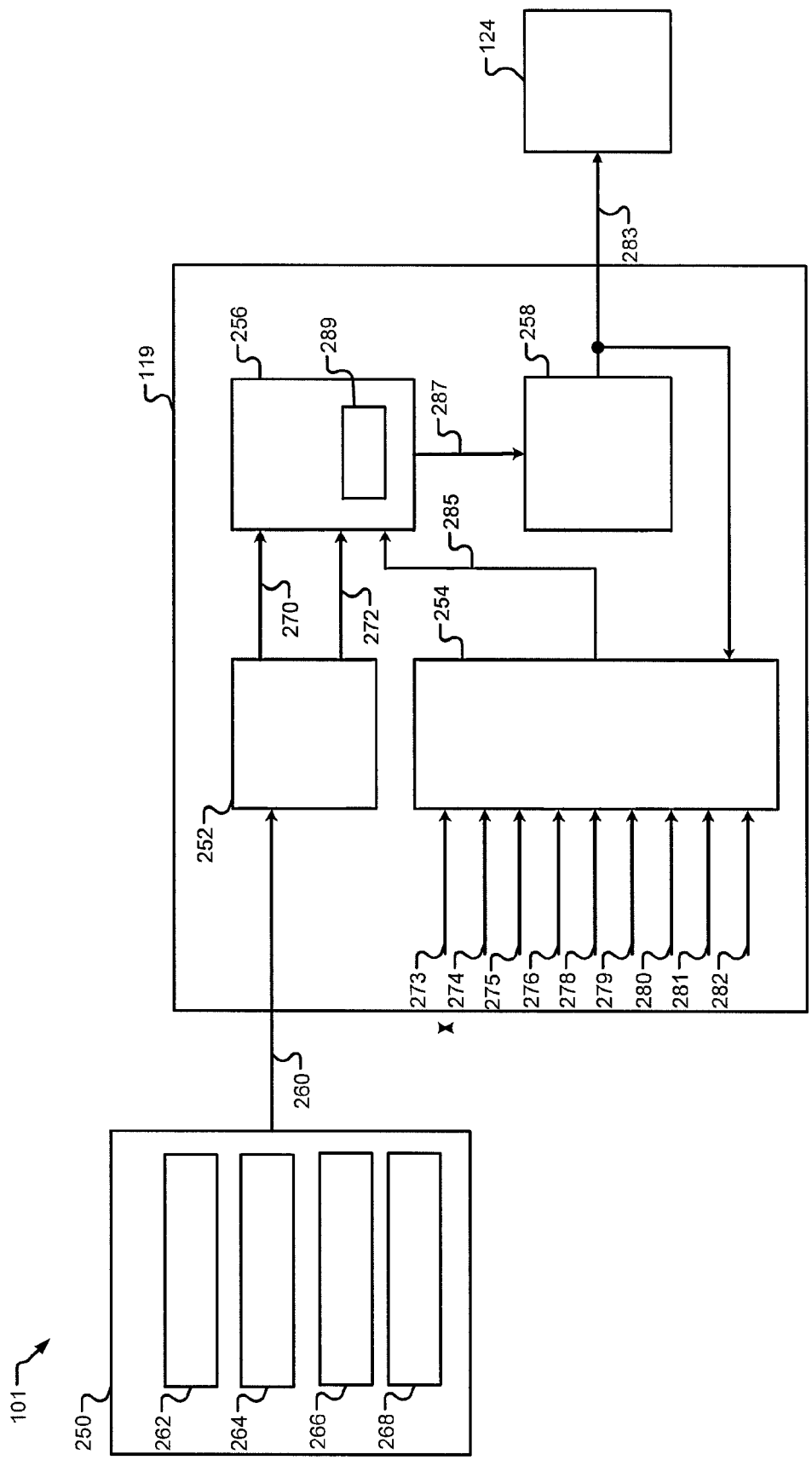
FIG. 2 is a functional block diagram of the stochastic pre-ignition mitigation system in accordance with the present disclosure.

Referring now also to FIG. 2, the SPI mitigation system 101 is shown. The SPI mitigation system 101 includes the fuel control module 119, the fuel injection system 124, and pre-ignition sensors 250. The fuel control module 119 includes a pre-ignition detection module 252, an engine load module 254, a pre-ignition evaluation module 256 and an actuator control module 258.

The pre-ignition detection module 252 detects SPI events based on sensor signals PRESENS (260) from the pre-ignition sensors 250. The pre-ignition sensors 250 may include knock sensor(s) 262, camshaft sensor(s) 264, crankshaft sensor(s) 266, or other suitable pre-ignition sensors 268. The knock sensor(s) 262 may include strain gauge based-sensors and/or piezoelectric sensors, which may be used to detect pre-ignition. The knock sensor(s) 262 may be used to detect engine vibrations caused by SPI events.

The camshaft and crankshaft sensors 264, 266 may be used to indirectly detect pre-ignition. For example, the camshaft and/or crankshaft sensors 264, 266 may be used to detect angular position and/or speed of a camshaft and/or crankshaft of the engine 102, which may be monitored by the pre-ignition detection module 252. The pre-ignition detection module 252 may determine changes in acceleration of the engine 102 based on signals from the camshaft and/or crankshaft sensors 264, 266. The pre-ignition detection module may then determine based on the change in acceleration and/or a rate of change in the acceleration whether a SPI event has initiated and/or occurred. The pre-ignition detection sensors 250 may mounted on the engine 102, the transmission 202 or in other suitable locations.

The pre-ignition detection module 252 generates a pre-ignition detection signal PREDET (270) and/or a pre-ignition magnitude signal PREMAG (272) in response to detecting a SPI event. The pre-ignition detection signal PREDET may indicate that a SPI event has initiated and/or occurred, time when the SPI event occurred, start time of the SPI event, and/or duration of the SPI event. The pre-ignition magnitude signal PREMAG may indicate a magnitude of a SPI event. This may be based on the pre-ignition sensor signals PRESENS. For example, a magnitude of the SPI event may be generated based on: magnitudes of signals from the knock sensors 262; accelerations determined based on signals from the camshaft and/or crankshaft sensors 264, 266; and/or changes in camshaft and/or crankshaft accelerations and/or a rate of change in the camshaft and/or crankshaft accelerations.

The engine load module 254 determines engine load. The engine load module 254 may determine engine load based on various parameters. The parameters may be determined based on parameter sensor signals from the above-described sensors of FIG. 1. For example, the engine load module 254 may determine engine load based on an engine speed signal RPM (273), a throttle position signal TPS (274), a mass air flow signal MAF (275), an intake air temperature signal IAT (276), an ambient temperature signal AMB (278), an oil temperature signal OIL (279), an engine coolant temperature ECT (280), a vehicle speed signal VEH (281), a manifold absolute pressure signal MAP (282), a fuel injection control signal FUEL (283), and/or other suitable sensor signals. The engine load module 254 generates an engine load signal LOAD (285) indicating the engine load based on the parameter sensor signals.

The pre-ignition evaluation module 256 selects a fuel injection mode based on the pre-ignition detection signal PREDET, the pre-ignition magnitude signal PREMAG, and/or the engine load signal LOAD. The fuel injection mode may be selected from the SPM, the dual-pulse mode, a triple-pulse mode, a MPM and/or other fuel injection mode. The pre-ignition evaluation module 256 generates a fuel injection mode signal INJMODE (287) indicating the fuel injection mode of operation.

The pre-ignition evaluation module 256 may include a timer 289. The pre-ignition evaluation module 256 may remain in a MPM based on a value of the timer 289. As an example, the timer 289 may be set to a predetermined amount of time (e.g., less than or equal to 2 seconds(s)) when the SPI mitigation system 101 transitions to a MPM mode. The predetermined amount of time or value of the timer 289 may be decremented while in the MPM mode. The pre-ignition evaluation module 256 may transition from the MPM to the SPM when the value of the timer 289 reaches zero and/or a predetermined value. As an alternative, the value of the timer 289 may be incremented to a predetermined value and the pre-ignition evaluation module 256 may transition from one of the MPMs to the SPM when the value of the timer 289 is equal to the predetermined value.

The actuator control module 258 generates the fuel injection control signal FUEL based on the fuel injection mode signal INJMODE. Although not shown in FIG. 2, the fuel control module 119 may generate the fuel injection control signal FUEL based on any of the sensor signals described above including the signals RPM, TPS, MAF, IAT, AMB, OIL, ECT, VEH, and MAP. The fuel injection control signal FUEL is transmitted to the fuel injection system 124 and may be received by one or more of the fuel injector(s).

Figure 3:
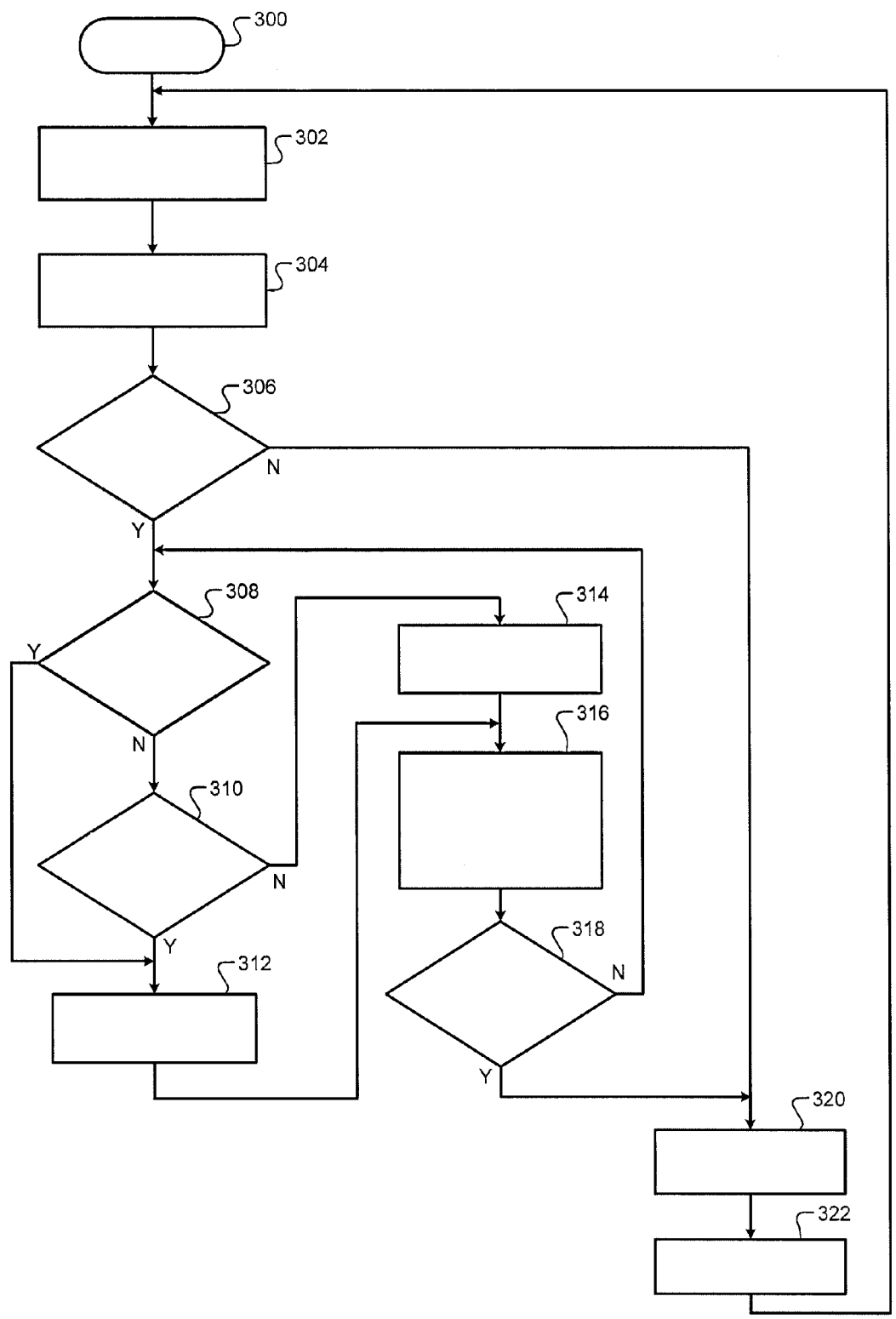
FIG. 3. illustrates a method of mitigating stochastic pre-ignition in accordance with the present disclosure.

The SPI mitigation system 101 may be operated using numerous methods. An example method is provided by the method of FIG. 3. In FIG. 3, a method of mitigating stochastic pre-ignition is shown. Although the following tasks are primarily described with respect to the implementations of FIGS. 1-2, the tasks may be easily modified to apply to other implementations of the present disclosure. The tasks may be iteratively performed. The method may begin at 300.

At 302, the parameter sensor signals described above are generated. This may include generating the pre-ignition sensors signals PRESENS and the sensor signals RPM, TPS, MAF, IAT, AMB, OIL, ECT, VEH, MAP, and FUEL. At 304, the engine load module 254 determines the engine load or output torque of the engine 102 based on the parameter sensor signals and generates the engine load signal LOAD. At 306, the pre-ignition detection module 252 determines if a SPI event has occurred. This may be based on the pre-ignition sensor signals PRESENS, as described above.

At 308 and 310, the pre-ignition evaluation module 256 determines a severity of the detected SPI event. At 308, the pre-ignition evaluation module 256 may determine whether the pre-ignition magnitude signal PREMAG is greater than a first predetermined threshold. Task 312 may be performed when the pre-ignition magnitude signal is greater than the first predetermined threshold, otherwise task 310 may be performed. In one implementation, task 308 is not performed. If task 318 is not performed, task 310 may be performed when a SPI event is detected and subsequent to task 306.

At 310, the pre-ignition evaluation module 256 determines whether the engine load or output torque of the engine 102 is greater than a second predetermined threshold. If the engine load or output torque is greater than the second predetermined threshold, task 312 may be performed, otherwise task 314 is performed.

At 312, the pre-ignition evaluation module 256 generates the fuel injection mode signal INJMODE to operate in the triple-pulse mode. If not already in the triple-pulse mode, the pre-ignition evaluation module 256 may transition from the SPM to the triple-pulse mode. At 314, the pre-ignition evaluation module 256 generates the fuel injection mode signal INJMODE to operate in the dual-pulse mode. If not already in the dual-pulse mode, the pre-ignition evaluation module 256 may transition from the SPM to the dual-pulse mode. At 316, the timer 289 may be started if not already started and/or a value of the timer 289 may be decremented (or incremented) if the timer 289 is already started.

At 318, the pre-ignition evaluation module 256 determines whether the SPI mitigation system 101 has operated in a MPM for the predetermined amount of time (e.g., the timer 289 has expired or decreased to zero). This assures that the SPI mitigation system 101 does not remain in a MPM for more than the predetermined amount of time. This minimizes a maximum temperature of fuel injection drivers of the ECM 114. The fuel injection drivers may be in the actuator control module 258 and used to generate the fuel injection control signal FUEL. Although shown in the fuel control module 119, the actuator control module 258 may be separate from and/or in communication with the ECM 114.

Task 320 may be performed when the SPI mitigation system 101 has operated in the MPM for more than the predetermined amount of time and/or the value of the timer 289 has reached zero, otherwise task 308 may be performed. At 320, the pre-ignition evaluation module 256 may generate the fuel injection mode signal INJMODE to operate in the SPM based on the value of the timer 289. The pre-ignition evaluation module 256 may transition from operating in one of the MPM modes to operating the SPM.

At 322, the timer 289 may be reset to the predetermined amount of time (e.g., a calibrated set time). This may include setting the timer 289 to the predetermined amount of time (e.g., less than or equal to 2 s). The predetermined amount of time may be set and/or adjusted by the pre-ignition evaluation module 256 based on the number of cylinders and/or fuel injectors in the engine 102. The number of cylinders and/or fuel injectors may be stored in the ECM 114 and/or determined by the pre-ignition evaluation module 256. As the number of active cylinders and/or fuel injectors are increased and/or as the speed of the engine 102 increases, the pre-ignition evaluation module 256 may decrease the predetermined amount of time of the timer 289. Conversely, as the number of active cylinders and/or fuel injectors are decreased and/or as the speed of the engine 102 decreases, the pre-ignition evaluation module 256 may increase the predetermined amount of time of the timer 289.

As an example, a first predetermined amount of time may be provided for a first number of cylinders and/or fuel injectors. A second predetermined amount of time may be provided for a second number of cylinders and/or fuel injectors. If the second number of cylinders and/or fuel injectors is more than the first number of cylinders and/or fuel injectors then the second predetermined amount of time may be less than the first predetermined amount of time. The predetermined amount of time of the timer 289 may be adjusted based on a number of active cylinders and/or fuel injectors. For example, the ECM 114 may deactivate one or more cylinders and/or fuel injectors. During periods when one or more cylinders and/or fuel injectors are deactivated, the predetermined amount of time may be increased relative to periods when one or more cylinders and/or fuel injectors are not deactivated.

The predetermined amount of time of the timer 289 may also be set and/or adjusted based on the speed (RPM) of the engine 102. Shorter predetermined amounts of time may be set for higher engine speeds. For example, a first predetermined amount of time may be set for a first engine speed. A second predetermined amount of time may be set for a second engine speed. If the second engine speed is greater than the first engine speed, the second predetermined amount of time may be less than the first predetermined amount of time.

In one implementation, the predetermined amount of time of the timer 289 may be set when a SPI event is detected and may remain at a constant value throughout the SPI event. In another implementation, the pre-ignition evaluation module 256 adjusts the predetermined amount of time of the timer 289 as the activated number of cylinders and/or fuel injectors changes, the speed of the engine changes, and/or as other parameters of the engine 102 change. The pre-ignition evaluation module 256 may adjust the predetermined amount of time during a single SPI event and/or between SPI events.

At 322, the timer 289 is not started when reset. The method may end subsequent to task 322 or may return to task 302, as shown.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A stochastic pre-ignition (SPI) mitigation system comprising:
a detection module generating a pre-ignition determination signal indicating detection of a SPI event in a cylinder of an engine, wherein the SPI event occurs during a first combustion cycle of the cylinder;
an engine load module determining load on the engine and generating an engine load signal, wherein the engine load signal indicates the load on the engine; and
an evaluation module, in response to detecting the SPI event and based on the pre-ignition determination signal and the engine load signal, (i) determining whether to operate in a single-pulse mode, a first multi-pulse mode or a second multi-pulse mode, and (ii) generating a mode signal to operate in a selected one of the single-pulse mode, the first multi-pulse mode, and the second multi-pulse mode,
wherein
the single pulse mode includes injecting a single pulse of fuel into the cylinder during a second combustion cycle of the cylinder, and wherein each of the first multi-pulse mode and the second multi-pulse mode includes injecting multiple pulses of fuel into the cylinder during the second combustion cycle of the cylinder,
the detection module generates a pre-ignition magnitude signal indicating a magnitude of the SPI event based on signals from a pre-ignition sensor; and
the evaluation module generates the mode signal to operate in the first multi-pulse mode when the load signal is less than or equal to a first predetermined threshold and the pre-ignition magnitude signal is less than or equal to a second predetermined threshold; and
the evaluation module generates the mode signal to operate in the second multi-pulse mode when the load signal is greater than the first predetermined threshold and the pre-ignition magnitude signal is greater than the second predetermined threshold, wherein the second multi-pulse mode has more pulses per combustion cycle than the first multi-pulse mode.

2. The SPI mitigation system of claim 1, wherein the detection module generates the pre-ignition determination signal based on sensor signals received from at least one pre-ignition sensor.

3. The SPI mitigation system of claim 1, wherein the evaluation module generates the mode signal to operate in the first multi-pulse mode or the second multi-pulse mode when the SPI event is detected and the engine load is greater than a predetermined load.

4. The SPI mitigation system of claim 3, wherein the evaluation module:
comprises a timer;
starts the timer when the SPI event is detected and the first multi-pulse mode or the second multi-pulse mode is initiated; and
transitions from the first multi-pulse mode or the second multi-pulse mode to the single-pulse mode based on a value of the timer and if an amount of time in the first multi-pulse mode or the second multi-pulse mode is greater than a predetermined amount of time.

5. The SPI mitigation system of claim 1, wherein the evaluation module generates the mode signal to operate in the second multi-pulse mode when the pre-ignition magnitude signal is less than or equal to the second predetermined threshold and the engine load signal is greater than the first predetermined threshold.

6. A powertrain system comprising:
the SPI mitigation system of claim 1, wherein the SPI mitigation system comprises an actuator control module, and wherein the actuator control module generates a fuel injection control signal based on the mode signal;
the pre-ignition sensor, wherein the pre-ignition sensor is configured to generate a sensor signal, and wherein the detection module detects the SPI event based on the sensor signal; and
a fuel injection system that injects fuel into the cylinder based on the fuel injection control signal.

7. A stochastic pre-ignition (SPI) mitigation method comprising:
generating a pre-ignition determination signal indicating detection of a SPI event in a cylinder of an engine, wherein the SPI event occurs during a first combustion cycle of the cylinder;
determining load on the engine and generating an engine load signal, wherein the engine load signal indicates the load on the engine;
in response to detecting the SPI event and based on the pre-ignition determination signal and the engine load signal, (i) determining whether to operate in a single-pulse mode a first multi-pulse mode, or a second multi-pulse mode, and (ii) generating a mode signal to operate in a selected one of the single-pulse mode, the first multi-pulse mode, and the second multi-pulse mode,
wherein the single pulse mode includes injecting a single pulse of fuel into the cylinder during a second combustion cycle of the cylinder, and wherein each of the first multi-pulse mode and the second multi-pulse mode includes injecting multiple pulses of fuel into the cylinder during the second combustion cycle of the cylinder;
generating a pre-ignition magnitude signal indicating a magnitude of the SPI event based on signals from at least one pre-ignition sensor; and
generating the mode signal to operate in the first multi-pulse mode when the load signal is less than or equal to a first predetermined threshold and the pre-ignition magnitude signal is less than or equal to a second predetermined threshold; and
generating the mode signal to operate in the second multi-pulse mode when the load signal is greater than the first predetermined threshold and the pre-ignition magnitude signal is greater than the second predetermined threshold.

8. The method of claim 7, further comprising generating the mode signal to operate in the first multi-pulse mode or the second multi-pulse mode when the SPI event is detected and the engine load is greater than a predetermined load.

9. The method of claim 8, further comprising:
starting a timer when the SPI event is detected and the first multi-pulse mode or the second multi-pulse mode is initiated; and
transitioning from the first multi-pulse mode or the second multi-pulse mode to the single-pulse mode based on a value of the timer and if an amount of time in the first multi-pulse mode or the second multi-pulse mode is greater than a predetermined amount of time.

10. The method of claim 7, further comprising generating the mode signal to operate in the second multi-pulse mode when the pre-ignition magnitude signal is less than or equal to the second predetermined threshold and the engine load signal is greater than the first predetermined threshold.

11. The method of claim 7, further comprising:
generating a sensor signal,
detecting the SPI event based on the sensor signal;
generating a fuel injection control signal based on the mode signal; and
injecting fuel into the cylinder based on the fuel injection control signal.

12. The SPI mitigation system of claim 4, wherein the evaluation module is configured to adjust the predetermined amount of time based on a number of active cylinders of the engine or a number of active fuel injectors of the engine.

13. The SPI mitigation system of claim 4, wherein the evaluation module is configured to adjust the predetermined amount of time based on a speed of the engine.

14. The SPI mitigation system of claim 4, wherein the evaluation module is configured to adjust the predetermined amount of time during the SPI event or a second SPI event.

15. The SPI mitigation system of claim 1, wherein the magnitude of the SPI event is generated based on:
a magnitude of a knock sensor; and
an amount of acceleration determined based on (i) a signal from a camshaft sensor, and (ii) a signal from a crankshaft sensor.

16. The SPI mitigation system of claim 1, wherein the magnitude of the SPI event is generated based on:
a change in acceleration of a camshaft or a crankshaft; and
a rate of change in the acceleration of the camshaft or the crankshaft.

17. The method of claim 7, wherein the magnitude of the SPI event is generated based on:
a magnitude of a knock sensor;
an amount of acceleration determined based on (i) a signal from a camshaft sensor, and (ii) a signal from a crankshaft sensor;
a change in the amount of acceleration; and
a rate of change in the amount of acceleration.

18. The method of claim 9, further comprising adjusting the predetermined amount of time based on (i) a number of active cylinders of the engine or a number of active fuel injectors of the engine, and (ii) a speed of the engine.

* * * * *